(12) United States Patent
Yeager et al.

(10) Patent No.: US 7,910,012 B2
(45) Date of Patent: Mar. 22, 2011

(54) COMPOSITION, MEMBRANE, AND ASSOCIATED METHOD

(75) Inventors: Gary William Yeager, Rexford, NY (US); Sharon Oba, Clifton Park, NY (US); Anatoli Kogan, Clifton Park, NY (US); Hua Wang, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 781 days.

(21) Appl. No.: 11/778,351

(22) Filed: Jul. 16, 2007

(65) Prior Publication Data
US 2009/0020473 A1  Jan. 22, 2009

(51) Int. Cl.
*B01D 65/00* (2006.01)
*B01D 39/00* (2006.01)
*B01D 39/14* (2006.01)

(52) U.S. Cl. .................. 216/41; 210/500.27; 210/500.28

(58) Field of Classification Search .................. 264/41; 210/500.37, 500.38, 500.23, 500.27–500.28; 528/289; 95/45–52; 96/4; 525/423, 398
See application file for complete search history.

(56) References Cited

U.S. PATENT DOCUMENTS

| | | | |
|---|---|---|---|
| 3,817,386 A | 6/1974 | Frost et al. | |
| 3,904,519 A | 9/1975 | McKinney, Jr. et al. | |
| 4,039,440 A | 8/1977 | Cadotte | |
| 4,144,190 A * | 3/1979 | Bowes et al. | 502/402 |
| 4,221,885 A * | 9/1980 | Schimmel et al. | 525/329.9 |
| 4,277,344 A | 7/1981 | Cadotte | |
| 4,304,591 A * | 12/1981 | Mueller et al. | 504/232 |
| 4,337,154 A | 6/1982 | Fukuchi et al. | |
| 4,465,566 A * | 8/1984 | Loutfy et al. | 205/393 |
| 4,650,755 A | 3/1987 | Wood et al. | |
| 4,659,474 A | 4/1987 | Perry et al. | |
| 4,690,765 A | 9/1987 | Linder et al. | |
| 4,690,766 A | 9/1987 | Linder et al. | |
| 4,720,345 A | 1/1988 | Linder et al. | |
| 4,753,725 A | 6/1988 | Linder et al. | |
| 4,767,645 A | 8/1988 | Linder et al. | |
| 4,778,596 A | 10/1988 | Linder et al. | |
| 4,885,091 A | 12/1989 | Swedo et al. | |
| 4,946,594 A * | 8/1990 | Thaler et al. | 210/651 |
| 4,983,291 A | 1/1991 | Chau et al. | |
| 5,180,496 A | 1/1993 | Sartori et al. | |
| 5,221,481 A | 6/1993 | Schucker | |
| 5,373,901 A | 12/1994 | Norman et al. | |
| 5,550,199 A | 8/1996 | Ho et al. | |
| 5,641,855 A * | 6/1997 | Scherr et al. | 528/310 |
| 5,670,052 A * | 9/1997 | Ho et al. | 210/651 |
| 5,693,227 A | 12/1997 | Costa | |
| 5,756,643 A | 5/1998 | Ho et al. | |
| 5,843,351 A | 12/1998 | Hirose et al. | |
| 5,922,203 A | 7/1999 | Tomaschke | |
| 6,024,873 A | 2/2000 | Hirose et al. | |
| 6,045,694 A | 4/2000 | Wang et al. | |
| 6,132,804 A | 10/2000 | Rice et al. | |
| 6,183,640 B1 | 2/2001 | Wang | |
| 6,245,234 B1 | 6/2001 | Koo et al. | |
| 6,436,315 B2 | 8/2002 | Butler | |
| 6,465,544 B1 * | 10/2002 | Bomal et al. | 523/213 |
| 6,833,073 B2 | 12/2004 | Agarwal | |
| 6,837,996 B2 | 1/2005 | Kurth et al. | |
| 6,987,150 B2 | 1/2006 | Kurth et al. | |
| 7,041,338 B2 * | 5/2006 | Nigam | 427/407.1 |
| 7,220,821 B2 | 5/2007 | Hahnle et al. | |
| 7,515,936 B2 * | 4/2009 | Feller | 455/557 |
| 7,638,053 B2 * | 12/2009 | Yeager et al. | 210/500.35 |
| 7,708,981 B2 * | 5/2010 | Maubru et al. | 424/70.11 |
| 2002/0160205 A1 | 10/2002 | Garcia et al. | |
| 2003/0042468 A1 | 3/2003 | Butler | |
| 2003/0138432 A1 | 7/2003 | Glazier | |
| 2003/0221831 A1 | 12/2003 | Reddy et al. | |
| 2005/0173245 A1 | 8/2005 | Feldman et al. | |
| 2005/0241957 A1 | 11/2005 | Mao et al. | |
| 2006/0249446 A1 | 11/2006 | Yeager | |
| 2006/0269817 A1 | 11/2006 | Cho et al. | |
| 2008/0035567 A1 * | 2/2008 | Sabottke | 210/640 |

FOREIGN PATENT DOCUMENTS

EP     1783147 A1    9/2007

OTHER PUBLICATIONS

PCT International Search Report dated Aug. 28, 2008.

* cited by examiner

*Primary Examiner* — Ana M Fortuna
(74) *Attorney, Agent, or Firm* — Mary Louise Gioeni

(57) ABSTRACT

A composition is provided. The composition may include a reaction product of a first composition having two or more anhydride moieties, a second composition having two or more hydroxyl moieties, and a third composition having at least one aziridine moiety. A method for forming a membrane from the composition is provided. A membrane formed from the composition is provided. Devices that include the membrane are provided, also.

2 Claims, No Drawings ical Field

The invention includes embodiments that may relate to a composition. The invention includes embodiments that may relate to a membrane. The invention includes embodiments that may relate to a method of making and/or using the composition.

2. Discussion of Related Art

The cost of organic resins and plasticizers for thermoset and thermoplastic application may depend on the availability of aromatic precursors, including benzene, toluene, and xylenes. These petrochemicals may be commodities where the product conforms to a specification with limited variability.

In the petrochemical industry, the cost of production may depend on the expense of raw materials and energy. The quality of feed may affect the production of a refined product. An unrefined feed may result in repetitive process steps to obtain the same quality of refined product as a relatively refined feed may produce in fewer steps.

A method for producing high purity aromatic compositions is through a repetitive distillation and liquid/liquid extraction process. Because of the expense of solvents and their recovery, the extraction may be economically undesirable. Therefore a lower cost alternative avoiding extraction, recovering aromatic compositions alone may be desirable. One potential process to achieve this is distillation; however, co-boiling non-aromatic compositions and other impurities may undesirably impact efficiency of subsequent processing steps or may damage the end product.

It may be desirable to obtain a composition having properties and characteristics that might not otherwise be available. It may be desirable to have a membrane having properties and characteristics that might not otherwise be available in conventional membranes. It may be desirable to have a method of using the composition and a method of making a membrane that differs from otherwise be available in conventional membranes.

BRIEF DESCRIPTION

In one embodiment, a composition having a reaction product of a first composition having two or more anhydride moieties, a second composition having two or more hydroxyl moieties, and a third composition having at least one aziridine moiety.

In one embodiment, a method includes mixing a first composition having two or more anhydride moieties with a second composition having two or more hydroxyl moieties in a solvent; to produce a polyamide-ester intermediate solution; adding a third composition having at least one aziridine moiety to the polyamide-ester intermediate solution to produce a membrane-formable solution; and forming a membrane from the membrane-formable solution.

A membrane formed from the composition is provided. Devices that include the membrane are provided, also. In various aspects, these devices may include a water desalination apparatus, a blood filtration apparatus, or an organic solvent separation device.

DETAILED DESCRIPTION

The invention includes embodiments that may relate to a composition. The invention includes embodiments that may relate to a membrane. The invention includes embodiments that may relate to a method of making and/or using the composition.

Approximating language, as used herein throughout the specification and clauses, may be applied to modify any quantitative representation that could permissibly vary without resulting in a change in the basic function to which it is related. Accordingly, a value modified by a term or terms, such as about, may not be limited to the precise value specified. In at least some instances, the approximating language may correspond to the precision of an instrument for measuring the value. Similarly, free may be used in combination with a term, and may include an insubstantial number, or trace amounts, while still being considered free of the modified term.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

As used herein, the term "pervaporation" refers to a separation process, where the mixture to be separated, that is the feed, is brought into contact with one side of the membrane and, on the other side, that is on the side of the permeated phase the feed is withdrawn in the liquid or gaseous form. The "permeated phase" refers to a pure component of the feed, or a mixture enriched in one or more components.

As used herein, the term "perstraction" refers to a process of selective dissolution of particular components contained in a feed into the membrane, followed by the removal of the diffused components from the downstream side of the membrane by use of a liquid sweep stream.

As used herein, the term "non-aromatic" refers to a hydrocarbon composition having no aromatic nucleus. The non-aromatic composition may contain other heteroatoms at levels that do not significantly alter the basic chemical characteristics of the hydrocarbon, nor its relative permeability in the semi-permeable membranes as described herein. The term "semi-permeable membrane" includes any semi-permeable material which can be used to separate components of a feed fluid into a permeate that passes through the material and a retentate that is rejected or retained by the material.

As used herein, the term "aliphatic radical" refers to a radical having a valence of at least one comprising a linear or branched array of atoms that is not cyclic. The array may include heteroatoms such as nitrogen, sulfur, silicon, selenium and oxygen or may be composed exclusively of carbon and hydrogen. Aliphatic radicals may be "substituted" or "unsubstituted". A substituted aliphatic radical is defined as an aliphatic radical that comprises at least one substituent. A substituted aliphatic radical may comprise as many substituents as there are positions available on the aliphatic radical for substitution. Substituents that may be present on an aliphatic radical include but are not limited to halogen atoms such as fluorine, chlorine, bromine, and iodine. Substituted aliphatic radicals include trifluoromethyl, hexafluoroisopropylidene, chloromethyl; difluorovinylidene; trichloromethyl, bromoethyl, bromotrimethylene (e.g. —$CH_2CHBrCH_2$—), and the like. For convenience, the term "unsubstituted aliphatic radical" is defined herein to encompass, as part of the "linear or branched array of atoms which is not cyclic" comprising the unsubstituted aliphatic radical, a wide range of functional groups. Examples of unsubstituted aliphatic radicals include allyl, aminocarbonyl (i.e., —$CONH_2$), carbonyl, dicyanoisopropylidene (i.e., —$CH_2C(CN)_2CH_2$—), methyl (i.e., —$CH_3$), methylene (i.e., —$CH_2$—), ethyl, ethylene, formyl, hexyl, hexamethylene, hydroxymethyl (i.e. —$CH_2OH$), mercaptomethyl (i.e., —$CH_2SH$), methylthio (i.e., —$SCH_3$), methylthiomethyl (i.e., —$CH_2SCH_3$), methoxy, methoxycarbonyl, nitromethyl (i.e., —$CH_2NO_2$), thiocarbonyl, trimethylsilyl, t-butyldimethylsilyl, trimethyoxysilypropyl, vinyl, vinylidene, and the like. Aliphatic radicals are defined to comprise at least one carbon atom. A $C_1$-$C_{10}$ aliphatic radical includes substituted aliphatic radicals and unsubstituted aliphatic radicals containing at least one but no more than 10 carbon atoms.

The term aromatic is used to mean a hydrocarbon composition containing one or more aromatic rings. The archetypal aromatic compositions include benzene. Other mononuclear aromatic include toluene and xylene. Aromatic compositions having one or more than one aromatic rings include, for example, tetrahydronaphthalene, naphthalene, anthracene, fluorene, biphenyl, pyridine, and thiophene. The process feed may contain aromatic hydrocarbons having 1 or more aromatic rings.

The term "aromatic radical" refers to an array of atoms having a valence of at least one and including at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical that comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. Aromatic radicals may be "substituted" or "unsubstituted". A substituted aromatic radical is defined as an aromatic radical which comprises at least one substituent. A substituted aromatic radical may comprise as many substituents as there are positions available on the aromatic radical for substitution. Suitable aromatic radical substituents may include halogen atoms such as fluorine, chlorine, bromine, and iodine. Substituted aromatic radicals include trifluoromethylphenyl, hexafluoroisopropylidenebis(4-phenyloxy) (i.e., —$OPhC(CF_3)_2PhO$—), chloromethylphenyl; 3-trifluorovinyl-2-thienyl; 3-trichloromethylphenyl (i.e., 3-$CCl_3Ph$-), bromopropylphenyl (i.e., $BrCH_2CH_2CH_2Ph$-), and the like. The term "unsubstituted aromatic radical" is defined herein to encompass, as part of the "array of atoms having a valence of at least one comprising at least one aromatic group", a wide range of functional groups. Examples of unsubstituted aromatic radicals include 4-allyloxyphenoxy, aminophenyl (i.e., $H_2NPh$-), aminocarbonylphenyl (i.e., $NH_2COPh$-), 4-benzoylphenyl, dicyanoisopropylidenebis(4-phenyloxy) (i.e., —$OPhC(CN)_2PhO$—), 3-methylphenyl, methylenebis(4-phenyloxy) (i.e., —$OPhCH_2PhO$—), ethylphenyl, phenylethenyl, 3-formyl-2-thienyl, 2-hexyl-5-furanyl; hexamethylene-1,6-bis(4-phenyloxy) (i.e., —$OPh(CH_2)_6PhO$—); 4-hydroxymethylphenyl (i.e., 4-$HOCH_2Ph$-), 4-mercaptomethylphemyl (i.e., 4-$HSCH_2Ph$-), 4-methylthiophenyl (i.e., 4-$CH_3SPh$-), methoxyphenyl, methoxycarbonylphenyloxy (e.g. methyl salicyl), nitromethylphenyl (i.e., -$PhCH_2NO_2$), trimethylsilylphenyl, t-butyldimethylsilylphenyl, vinylphenyl, vinylidenebis(phenyl), and the like. The term "a $C_3$-$C_{10}$ aromatic radical" includes substituted aromatic radicals and unsubstituted aromatic radicals containing at least three but no more than 10 carbon atoms. The aromatic radical 1-imidazolyl ($C_3H_2N_2$—) represents a $C_3$ aromatic radical. The benzyl radical ($C_7H_8$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more monocyclic components. For example, a cyclohexylmethy group ($C_6H_{11}CH_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or can be composed exclusively of carbon and hydrogen. Cycloaliphatic radicals can be "substituted" or "unsubstituted". A substituted cycloaliphatic radical is defined as a cycloaliphatic radical, which comprises at least one substituent. A substituted cycloaliphatic radical may comprise as many substituents as there are positions available on the cycloaliphatic radical for substitution. Substituents which may be present on a cycloaliphatic radical include but are not limited to halogen atoms such as fluorine, chlorine, bromine, and iodine. Substituted cycloaliphatic radicals include trifluoromethylcyclohexyl, hexafluoroisopropylidenebis(4-cyclohexyloxy) (i.e., —$OC_6H_{11}C(CF_3)_2C_6H_{11}O$—), chloromethylcyclohexyl; 3-trifluorovinyl-2-cyclopropyl; 3-trichloromethylcyclohexyl (i.e., 3-$CCl_3C_6H_{11}$—), bromopropylcyclohexyl (i.e., $BrCH_2CH_2CH_2C_6H_{11}$—), and the like. The term "unsubstituted cycloaliphatic radical" is defined by example to include materials such as 4-allyloxycyclohexyl, aminocyclohexyl (i.e., $H_2N$ $C_6H_{11}$—), aminocarbonylcyclopenyl (i.e., $NH_2COC_5H_9$—), 4-acetyloxycyclohexyl, dicyanoisopropylidenebis(4-cyclohexyloxy) (i.e., —$OC_6H_{11}C(CN)_2C_6H_{11}O$—), 3-methylcyclohexyl, methylenebis(4-cyclohexyloxy) (i.e., —$OC_6H_{11}CH_2C_6H_{11}O$—), ethylcyclobutyl, cyclopropylethenyl, 3-formyl-2-terahydrofuranyl, 2-hexyl-5-tetrahydrofuranyl; hexamethylene-1,6-bis(4-cyclohexyloxy) (i.e., —$OC_6H_{11}(CH_2)_6C_6H_{11}O$—); 4-hydroxymethylcyclohexyl (i.e., 4-$HOCH_2C_6H_{11}$—), 4-mercaptomethylcyclohexyl (i.e., 4-$HSCH_2C_6H_{11}$—), 4-methylthiocyclohexyl (i.e., 4-$CH_3SC_6H_{11}$—), 4-methoxycyclohexyl, 2-methoxycarbonylcyclohexyloxy (2-$CH_3OCO$ $C_6H_{11}O$—), nitromethylcyclohexyl (i.e., $NO_2CH_2C_6H_{10}$—), trimethylsilylcyclohexyl, t-butyldimethylsilylcyclopentyl, 4-trimethoxysilyethylcyclohexyl (e.g., $(CH_3O)_3$ SiCH$_2$CH$_2$C$_6$H$_{10}$—), vinylcyclohexenyl, vinylidene bis(cyclohexyl), and the like. The term "a C$_3$-C$_{10}$ cycloaliphatic radical" includes substituted cycloaliphatic radicals and unsubstituted cycloaliphatic radicals containing at least three but no more than 10 carbon atoms. The cycloaliphatic radical 2-tetrahydrofuranyl (C$_4$H$_7$O—) represents a C$_4$ cycloaliphatic radical. The cyclohexylmethyl radical (C$_6$H$_{11}$CH$_2$—) represents a C$_7$ cycloaliphatic radical.

The term "alkyl" as used in the various embodiments of the invention is intended to designate both linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. The term "alkyl" also encompasses alkyl portion of alkoxide groups. In various embodiments normal and branched alkyl radicals are those containing from 1 to about 32 carbon atoms, and include as illustrative non-limiting examples C$_1$-C$_{32}$ alkyl optionally substituted with one or more groups selected from C$_1$-C$_{32}$ alkyl, C$_3$-C$_{15}$ cycloalkyl or aryl; and C$_3$-C$_{15}$ cycloalkyl optionally substituted with one or more groups selected from C$_1$-C$_{32}$ alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the invention are those substituted or unsubstituted aryl radicals containing from 6 to 18 ring carbon atoms. Some illustrative non-limiting examples of these aryl radicals include C$_6$-C$_{15}$ aryl optionally substituted with one or more groups selected from C$_1$-C$_{32}$ alkyl, C$_3$-C$_{15}$ cycloalkyl or aryl. Some particular illustrative examples of aryl radicals comprise substituted or unsubstituted phenyl, biphenyl, toluoyl and naphthyl.

A composition includes a reaction product of a first composition having two or more anhydride moieties, a second composition having two or more hydroxyl moieties, and a third composition having at least one aziridine moiety.

In one embodiment, the first composition includes a dianhydride. Suitable dianhydrides may include dianhydrides represented by Formula 1, Formula 2, or Formula 3:

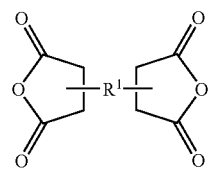

Formula 1

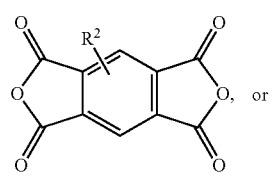

Formula 2

-continued

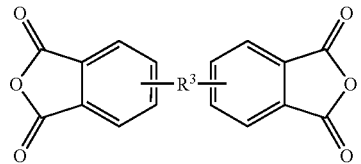

Formula 3 where, R$^1$ or R$^2$ or R$^3$ may include one or more of an aromatic radical, an aliphatic radical, or a cycloaliphatic radical. R$^1$ or R$^2$ or R$^3$ may include a sulfur-containing linkage including, but not limited to, sulfide, sulfoxide, sulfone, and the like; or a phosphorus-containing linkage including, but not limited to, phosphinyl, phosphonyl, and the like. In one embodiment, R$^1$ or R$^2$ or R$^3$ may be oxygen, sulfur or sulfone.

Suitable examples of cycloaliphatic group radicals may include cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, and the like; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. In one embodiment, the first composition includes bisphenol-A dianhydride.

In one embodiment, the second composition may include a polyol. The polyol is at least one selected from the group consisting of ethylene glycol, propylene glycol, butanediol, xylene glycol and chemical equivalents of the same. Suitable examples of polyols may include polyethylene adipate, polyethylene succiniate, polyethylene glutarate, a polypropylene adipate, polypropylene succinate, polypropylene glutarate, polyethylene glycol, polypropylene glycol, poly(ethylene-ran-propylene glycol), and poly(ethylene-block-propylene glycol).

In one embodiment, the polyol may be represented by the structure shown in Formula 4.

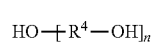

Formula 4

$$HO-[R^4-OH]_n$$

wherein R$^4$ may include one or more of an aromatic radical, an aliphatic radical, or a cycloaliphatic radical. In one embodiment, R$^4$ may be a sulfur-containing linkage including, but not limited to, sulfide, sulfoxide, sulfone, and the like; or a phosphorus-containing linkage including, but not limited to, phosphinyl, phosphonyl, and the like. In one embodiment, R$^4$ may include oxygen, sulfur or sulfone. The subscript n may be 1 or greater. In one embodiment, the subscript n is in a range from 1 to about 3. However, when R$^4$ is polystyrene, the value of n may be in a range of from 1 to about 50, from about 50 to about 150, from about 150 to about 300, from about 300 to about 400, or from about 400 to about 500.

In one embodiment, the two or more hydroxyl moieties of the second composition are pendant from an organic portion that is an oligomer or a polymer backbone. In another embodiment, the two or more hydroxyl moieties of the second composition are pendant from an organic portion that is a cross-linkable reactive monomer.

In place of polyols, mixtures including two or more hydroxy-substituted hydrocarbons may be employed in the second composition. In one embodiment, mixtures of at least two monohydroxy-substituted alkyl hydrocarbons, or mixtures of at least one monohydroxy-substituted alkyl hydrocarbon and at least one dihydroxy-substituted alkyl hydrocarbon, or mixtures of at least two dihydroxy-substituted alkyl hydrocarbons, or mixtures of at least two monohydroxy-substituted aromatic hydrocarbons, or mixtures of at least two dihydroxy-substituted aromatic hydrocarbons, or mixtures of at least one monohydroxy-substituted aromatic hydrocarbon and at least one dihydroxy-substituted aromatic hydrocarbon, or mixtures of at least one monohydroxy-substituted alkyl hydrocarbon and at least one dihydroxy-substituted aromatic hydrocarbon may be employed.

In one embodiment, the second composition may include a diol. A diol may include a monomer, an oligomer, or a polymer having two or more hydroxyl moieties. Exemplary monomers include an ester, an amide, an ether, a sulfone, or a sulfonamide. Exemplary oligomers or polymers may include one or more of an ester, an amide, an ether, a sulfone, or a sulfonamide.

Chemical equivalents to the diols include esters, such as dialkylesters, diaryl esters, and the like. In another embodiment, there can be diols present, which can be straight chain, branched, or cycloaliphatic diols and may contain from 2 to 12 carbon atoms. Examples of such diols include but are not limited to ethylene glycol, propylene glycol, i.e., 1,2- and 1,3-propylene glycol, 2,2-dimethyl-1,3-propanediol 2-ethyl, 2-methyl, 1,3-propanediol, 1,3- and 1,5-pentane diol, dipropylene glycol, 2-methyl-1,5-pentane diol, 1,6-hexane diol, dimethanol decalin, dimethanolbicyclooctane, 1,4-cyclohexane dimethanol and particularly its cis- and trans-isomers, triethylene glycol, 1,10-decanediol, and mixtures of any of the foregoing. In one embodiment, the diol include glycols, such as ethylene glycol, propylene glycol, butanediol, hydroquinone, resorcinol, trimethylene glycol, 2-methyl-1,3-propane glycol, 1,4-butanediol, hexamethylene glycol, xylene glycol, decamethylene glycol, 1,4-cyclohexanedimethanol, or neopentylene glycol.

In yet another embodiment, the diols include polyvalent alcohols that include, but are not limited to, an aliphatic polyvalent alcohol, an alicyclic polyvalent alcohol, and an aromatic polyvalent alcohol, including ethylene glycol, propylene glycol, 1,3-propanediol, 2,3-butanediol, 1,4-butanediol, 1,5-pentanediol, 1,6-hexanediol, neopentyl glycol, diethylene glycol, dipropylene glycol, 2,2,4-trimethyl-1,3-pentanediol, polyethylene glycol, polypropylene glycol, polytetramethylene glycol, trimethylolethane, trimethylolpropane, glycerin, pentaerythritol, 1,4-cyclohexanediol, 1,4-cyclohexanedimethanol, spiroglycol, tricyclodecanediol, tricyclodecanedimethanol, m-xylene glycol, o-xylene glycol, p-xylene glycol, 1,4-phenylene glycol, bisphenol A, lactone polyester and polyols.

In one embodiment, the second composition includes a diol-terminated polyethylene adipate or a diol-terminated polyethylene succinate. In one embodiment, the organic portion may include one or more groups of an ester, an amide, an ether, a sulfone, or a sulfonamide. These organic portions may be terminated by a hydroxyl.

In one embodiment, the third composition may include a structure represented by the structure shown in Formula 5

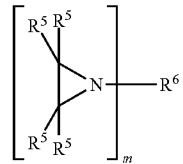

Formula 5 wherein m is at least 2, and wherein $R^5$ may include one or more of hydrogen, an aliphatic radical, a cycloaliphatic radical, or an aromatic radical, and wherein $R^6$ comprises one or more of an aliphatic radical, a cycloaliphatic radical, or an aromatic radical.

Suitable aliphatic radicals for $R^5$ may include methyl, ethyl, propyl, and butyl moieties. In one embodiment, the third composition includes a derivative of tris(2-methyl-1-aziridinepropionate). For example, the tris(2-methyl-1-aziridine propionate) derivative may be trimethylolpropane tris(2-methyl-1-aziridine propionate) or pentaerythritol tris(2-methyl-1-aziridinepropionate). In one embodiment, the third composition comprises monomethyl aziridine propionate.

The separation of aromatic compositions from non-aromatic compositions may upgrade the refinement quality of aromatic-containing streams in petroleum refineries. Such aromatic-containing streams may contain one or more of light aromatic naphtha, intermediate catalytic naphtha, heavy catalytic naphtha, and reformate streams. The refinement quality may increase by partially removing aliphatic components from the aromatic compositions.

A membrane may be made from the composition of the invention. The membrane may be in the form of a film, a tube, a solid fiber, a hollow fiber, a plate, or a frame. The membrane may be a semi-permeable membrane. The semi-permeable membrane may have a structure that is symmetric, asymmetric, or composite. Symmetric membranes may be characterized as having a homogeneous pore structure throughout the membrane material. A symmetric membrane according to an embodiment of the invention may be a microfiltration membrane, ceramic membrane, or a track-etched microporous membrane. Asymmetric membranes are characterized as having a heterogeneous pore structure throughout the membrane material. These membranes may have a thin "skin" layer having a smaller pore structure relative to the underlying material. An asymmetric membrane according to an embodiment of the invention may be an ultrafiltration membrane. Composite membranes may have a thin film (matrix) layered on a porous support. In one embodiment, a membrane according to the invention may have the composition formed as a thin film on a porous support.

Thinner membranes permit higher rates of permeation. Therefore, thinner membranes may be preferred in separation processes over thicker membranes—all other factors being equal. However, the membranes must have adequate strength and stability so that they may be handled such that very less or no fractures or weak points arise during use of the membranes. In one embodiment, for an unsupported and non-composite membrane, the thickness of the membrane may be in a range from about 0.5 micrometers to about 50 micrometers, from about 50 micrometers to about 150 micrometers, from about 150 micrometers to about 250 micrometers, from about 250 micrometers to about 350 micrometers, from about 350 micrometers to about 500 micrometers, from about or more than about 5 millimeters.

With regard to composite membranes having a thin skin over a porous support layer, a suitable thickness of the thin film may be less than about 20 micrometer. In one embodiment, the thickness of the thin film secured to a surface of the porous support is in a range of from about 20 micrometers to about 15 micrometers, about 15 micrometers to about 12 micrometers, about 12 micrometers to about 10 micrometers, about 10 micrometers to about 5 micrometers, about 5 micrometers to about 3 micrometers, about 3 micrometers to about 1 micrometer, or about 1 micrometer to about 0.5 micrometers.

In one embodiment, the membrane may have a pore size of less than about 0.003 micrometers. In another embodiment, the membrane may have a pore size in a range of from about 0.003 micrometers to about 0.050 micrometers, from about 0.050 micrometers to about 0.2 micrometers, or more than about 0.2 micrometers. The pores may be continuous and may extend all the way from one membrane surface to the opposing membrane surface. However, the pores may be formed so that the pores are discontinuous and do not extend fully through the body of the membrane. The pore distribution may be uniform, or may be substantially random. If the pores, in the broader definitional sense, are a mesh, mat or weave the inter-fiber distance may be considered the pore size.

The porous support may be chemically inert towards the feed solution. The porous support may be relatively stable to the operating pressure and temperature, and may be capable of adhering to the thin film. The porous support may be formed from one or more of polysulfone, polyethersulfone, polyvinylidene fluoride, polyvinylchloride, or polytetrafluoro ethylene. Other suitable materials for use forming the porous support may include ceramic, cermet, metal, and glass. Porous, as the term is used, include literal pores and also includes mats, weaves, and the like, as well as perforate films and sheets (such as a screen).

Even if not a functionally active composite membrane, the reaction solution may be casted onto a mechanical support to enable the membrane to withstand mechanical stress. In one embodiment, the support may include one or more of metal, glass, or polymeric material. If glass, the glass may be a woven fiber glass or a glass mat. If a polymeric material, the polymeric material may include one or more of nylon, polyester, polypropylene, polysulphone, polyvinylidene fluoride, polyarylene ether, polyacrylonitrile, polyether ketone, polyetheretherketone, polyamide, polyetherimide, polyphenylenesulfide, or polytetrafluoroethylene.

The membranes may be conditioned by contacting them with an organic lubricating oil. Examples of such oils include polyolefinic, ester, alkyl aromatic or silicone oils, mineral oils and petroleum wax. These materials may be dissolved in an appropriate solvent, such as an aromatic or aliphatic hydrocarbon, alcohol, ketone or ether solvents or mixtures thereof including toluene, mesitylene, acetone, methylbutyl ketone, and the like. Such agents allow the membrane to maintain its ductility such that defects are not produced during fabrication and handling while allowing the membrane to maintain its high flux and selectivity (lower thickness).

As noted above, the membrane may be employed in several end-use applications. One such application is a separation process. In one embodiment, the membrane may be employed for separation of aromatic compositions from aliphatic compositions. For example, membrane processes used for the purification of non-aromatic hydrocarbons from aromatic hydrocarbons include hyperfiltration, pervaporation, and perstraction. Hyperfiltration (Reverse Osmosis) is a processes that requires pressure that is greater than an opposing osmotic pressure of a permeate to be placed on the feed-side of a semi-permeable membrane. The greater feed-side pressure may drive the relatively more permeable component of the two components through the membrane. Pervaporation is a process using continual vaporization (with or without the application of feed side pressure) and a pressure gradient to drive permeate molecules through the semi-permeable membrane. Perstraction uses continual fluid or gas flow on the permeate side of a semi-permeable membrane to produce a pressure gradient to sweep away permeate as it emerges from the membrane surface. Suitable aids or carrier fluids include sulfolane or ether.

The membrane may be employed to selectively permeate at least a portion of an aromatic-rich composition as permeate from a feed, and retain the remaining non-aromatic-rich retentate in the feed. Further, the membrane may be used in chemical processes for aromatic compositions aromatic composition recovery. Suitable aromatic compositions may include benzene, toluene, xylene, and naphthalene.

In one embodiment, the membrane may be employed in hybrid processes that use aromatic feeds or produce aromatic streams, such as a hybrid aromatic compositions conversion or separation process, catalytic distillation process, or other hybrid adsorption, distillation, extraction or reforming processes. In such situations these membranes compliment other separation technologies and may thus be required to only partially purify the aromatic compositions from the non-aromatic streams.

The membrane may be used for aromatic isomerization, aromatic dealkylation aromatic disproportionation, aromatic hydrogenation, or aromatic alkylation. In these processes, the non-aromatic compositions in the feed may be at relatively low levels. The membranes may be employed in processes involving separation and/or purification of aromatic compositions. Suitable purification may include one or more of distillation, crystallization, extraction, adsorption, or filtration.

In the perstractive separation of aromatic compositions from saturates in petroleum or chemical streams (particularly heavy catalyzed naphtha streams) the aromatic molecules present in the feed stream dissolve into the membrane film due to similarities between the membrane solubility parameter and those of the aromatic species in the feed. The aromatic compositions then permeate (diffuse) through the membrane and are swept away by a sweep liquid, which is low in aromatic compositions content. This keeps the concentration of aromatic compositions at the permeate side of the membrane film low and maintains the concentration gradient which is responsible for the permeation of the aromatic compositions through the membrane In pervaporation, the material transport through the membrane is affected under a driving force and a pressure differential. For example, a relatively higher pressure may be on the feed side and/or a relatively lower pressure may be on the side of the permeate side. While the higher pressure may be applied, a vacuum may be used to create the pressure differential.

The process for separating aliphatic compositions from aromatic compositions may be carried out discontinuously as a batch process. Alternatively, the separation process may be performed continuously. A recursive or serial process may be used to further refine process yield.

The pressure employed on the feed may be at least greater than that sufficient to overcome the osmotic pressure difference between the feed stream and the permeate stream. The pressure differential between the side having the remaining feed after permeation and the permeate side of the membrane may be in a range from about 100 psi to about 250 psi, from about 250 psi to about 500 psi, from about 500 psi to about 750 psi, from about 750 psi to about 1000 psi, or greater than about 1000 psi.

Mixed solvent solutions may have a freezing point that is lower than water. As such, sub-zero separations may be possible, and where evaporation control is desirable lower temperatures may provide some benefit. Floor use temperatures may be determined with reference to the membrane performance at those temperatures. In one embodiment, the temperatures under which the feed comes in contact with the membrane is in a range from about −20 degrees Celsius to about 0 degree Celsius, from about 0 degree Celsius to about 50 degrees Celsius, from about 50 degrees Celsius to about 100 degrees Celsius, from about 100 degrees Celsius to about 150 degrees Celsius, or greater than about 150 degrees Celsius.

In addition to separation of aromatic compositions from other compositions, the membrane may be used in other end-use applications. The membrane may be employed in a blood filtration device. The membrane may be employed in a water desalination device. The membrane may be employed in an organic solvent separation device.

In one embodiment, a method of making the membrane from the composition may include mixing a first composition having two or more anhydride moieties with a second composition having two or more hydroxyl moieties in a solvent; to produce a polyamide-ester intermediate solution. The reaction may be performed in a solvent to produce a polyamide-ester intermediate composition. Suitable solvents may include a polar aprotic solvent. Suitable polar aprotic solvents may include one or more of dimethylformamide, dimethylacetamide, N-methylpyrrolidinone, dimethylsulfoxide, acetonitrile, tetrahysrofuran, ketone, or acetone. The polyamide-ester intermediate solution may be reacted with a third composition having at least one aziridine moiety to produce a membrane-formable solution. In one embodiment, a membrane may be formed from the membrane-formable solution.

The first composition may be present in an amount ranging from about 1 mole percent to about 75 mole percent based on the total mole percent of the composition. The second composition may be present in an amount in range from about 20 to about 80 mole percent based on the total mole percent of the composition. The weight ratio of the first composition to the second compositions may be in a range from about 0.5:1 to about 0.75:1, from about 0.5:0.75 to about 1:0.75, from about 0.75:1 to about 1:0.5, or greater than about 1:0.5. The third composition may be present in an amount ranging from about 10 mole percent to about 80 mole percent based on the total of the composition. The weight ratio of the second and third compositions may be in a range from about 0.5:1 to about 0.75:1, from about 0.5:0.75 to about 1:0.75, from about 0.75:1 to about 1:0.5, or greater than about 1:0.5.

In one embodiment, the first composition may include a bisphenol-A dianhydride, the second composition may include a diol-terminated polyethylene adipate or diol-terminated polyethylene succinate, and the third composition may include trimethylolpropane tris(2-methyl-1-aziridine propionate) or pentaeylthritol tris(2-methyl-1-aziridine propionate). The composition may include a thickener, such as fumed silica.

EXAMPLES

Unless specified otherwise, ingredients are commercially available from such common chemical suppliers as Aldrich Chemical Company (Milwaukee, Wis.).

Analysis is performed as $^1$H-NMR on a 400 MHz Bruker NMR spectrometer. Selectivity is determined by ratioing of $^1$H-NMR resonances at for mesitylene to the 1H-NMR resonances for decane to determine the molar ratio of two components in the permeate. The molar ratio is thus calculated. The molar ratio divided by the feed ratio gives a selectivity value.

Examples 1-3

Synthesis of Poly(Bisphenol-A dianyhdride:oligoesterdiol:polyaziridine) Membrane A three neck, 250 mililiter round-bottom flask is charged with 138 grams of N,N-dimethylformamade, 5.14 grams (0.01 moles) of bisphenol-A dianhydride, and 20 grams (0.01 moles) of polyethylene adipate diol (Mn=2000 grams/mole). The solution is heated at 80 degrees Celsius for 3 hours. After heating the solution, the solution is treated with 2 grams of fumed silica and vigourously stirred and the solution is degassed. The solution is then treated with 0.42 grams (0.0009 moles) of trimethylolpropane tris(2-methyl-1-aziridinepropionate) and the solution is stirred for 5 minutes. The solution is then coated onto a sheet of expanded polytetrafluoroethylene having a pore size of about 10 micrometers and baked for 20 minutes. The resulting membrane is cooled to room temperature and 3 membrane samples are cut for pervaporation testing.

A pervaporation experiment is carried out with a feed containing a mixture of mesitylene and decane in a 50:50 weight ratio. The feed temperature and pressure, and the permeate side pressure are industry standard. After an initial equilibration period, the permeate is collected in a dry ice cold trap and its weight measured. The permeate is further analyzed by $^1$H-NMR spectroscopy to determine its composition (comparing the aromatic signals for mesitylene with the aliphatic signals for N-decane) and determine the membrane selectivity. Three pervaporation tests on the membrane are performed. The results are shown in Table 1.

TABLE 1

Pervaporation Selectivity and Flux of a (polyanydride-ester-aziridine) Membrane towards a Mesitylene/Decane (50/50) feed.

| Example | Bisphenol-A Dianhydride (grams) | Polyethylene adipate; Mn = 2000 (grams) | Trimethylolpropane tris(2-methyl-1-aziridinepropionate) (grams) | Fumed Silica (grams) | N,N-dimethylformamide (grams) | Flux | Mesitylene/Decane Selectivity (kg-mm/m$^2$-day) |
|---|---|---|---|---|---|---|---|
| 1 | 5.14 | 20 | 0.42 | 2 | 138 | 3900 | 3.5 |
| 2 | 5.14 | 20 | 0.42 | 2 | 138 | 2900 | 3.3 |
| 3 | 5.14 | 20 | 0.42 | 2 | 138 | 1030 | 4.6 |
| Average | | | | | | 2610 | 3.8 |

Reactants and components referred to by chemical name or formula in the specification or clauses hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

The foregoing examples are merely illustrative of some of the features of the invention. The appended claims are intended to claim the invention as broadly as it may have been conceived and the examples herein presented are illustrative of selected embodiments from a manifold of all possible embodiments. Accordingly it is Applicants' intention that the appended claims are not to be limited by the choice of examples utilized to illustrate features of the invention. Where necessary, ranges have been supplied, those ranges are inclusive of all sub-ranges there between. It is to be expected that variations in these ranges will suggest themselves to a practitioner having ordinary skill in the art and where not already dedicated to the public, those variations should be covered by the appended claims. Advances in science and technology will make equivalents and substitutions possible that are not now contemplated by reason of the imprecision of language and these variations should also be construed where possible to be covered by the appended claims.

The invention claimed is:

1. A method, comprising:
   mixing a first composition comprising bisphenol-A dianhydride with a second composition comprising diol-terminated polyethylene adipate or diol-terminated polyethylene succinate in a solvent; to produce a polyester acid intermediate solution;
   adding a third composition comprising trimethylolpropane tris(2-methyl-1-aziridine propionate) or pentaeylthritol tris(2-methyl-1-aziridine propionate) to the polyester acid intermediate solution to produce a membrane-formable solution; and
   forming a membrane from the membrane-formable solution.

2. The method as defined in claim 1, further comprising selecting the solvent from dimethylformamide, dimethylacetamide, N-methylpyrrolidinone, dimethylsulfoxide, acetonitrile, tetrahysrofuran, ketone, or acetone.

* * * * *